US007562452B2

(12) United States Patent
Komuro

(10) Patent No.: US 7,562,452 B2
(45) Date of Patent: Jul. 21, 2009

(54) METHOD FOR MANUFACTURING A LIQUID EJECTION ELEMENT

(75) Inventor: Hirokazu Komuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 11/179,542

(22) Filed: Jul. 13, 2005

(65) Prior Publication Data

US 2006/0012640 A1 Jan. 19, 2006

(30) Foreign Application Priority Data

Jul. 16, 2004 (JP) ............................ 2004-210141

(51) Int. Cl.
*B23P 17/00* (2006.01)
*B21D 53/76* (2006.01)

(52) U.S. Cl. .................... 29/890.1; 29/890.09; 347/47; 216/27

(58) Field of Classification Search ................ 29/890.1, 29/830, 832, 831, 847, 890.09; 216/27, 44, 216/26; 347/54, 55, 68–70, 71; 427/524, 427/510
See application file for complete search history.

(56) References Cited

U.S. PATENT DOCUMENTS

| | | | | |
|---|---|---|---|---|
| 4,661,798 | A * | 4/1987 | Ohtsu | 345/10 |
| 4,889,587 | A | 12/1989 | Komuro | 156/643 |
| 4,936,952 | A | 6/1990 | Komuro | 156/643 |
| 4,968,992 | A | 11/1990 | Komuro | 346/1.1 |
| 5,513,431 | A * | 5/1996 | Ohno et al. | 29/890.1 |
| 5,940,099 | A * | 8/1999 | Karlinski | 347/70 |
| 5,945,260 | A * | 8/1999 | Miyagawa et al. | 430/320 |
| 6,455,112 | B1 * | 9/2002 | Ohkuma et al. | 427/504 |
| 6,461,798 | B1 * | 10/2002 | Ohkuma et al. | 430/320 |
| 6,527,371 | B2 * | 3/2003 | Yamazaki et al. | 347/50 |
| 2006/0012639 | A1 | 1/2006 | Komuro | 347/59 |
| 2006/0012641 | A1 | 1/2006 | Komuro | 347/61 |

FOREIGN PATENT DOCUMENTS

| | | | |
|---|---|---|---|
| JP | 11-227214 | * | 8/1999 |
| JP | 11-227214 | A | 8/1999 |
| JP | 2000-52549 | | 2/2000 |
| JP | 2002-67328 | | 3/2002 |

* cited by examiner

*Primary Examiner*—Tai Nguyen
(74) *Attorney, Agent, or Firm*—Fitzpatrick, Cella, Harper & Scinto

(57) ABSTRACT

A manufacturing method for manufacturing a liquid ejection element including a liquid flow path which is open at an ejection outlet for ejecting liquid, and an energy generating member for generating energy usable for ejecting the liquid from liquid flow path through the ejection outlet, the manufacturing method, includes a step of forming the energy generating member on a front side of a substrate; a step of forming a top plate member on the side having the energy generating member formed by the energy generating member forming step, wherein the top plate member is a member in which the liquid flow path and the ejection outlet are formed; and a step of thinning the substrate, having the top plate member formed thereon by the top plate member forming step, from a back side thereof.

10 Claims, 14 Drawing Sheets

METHOD FOR MANUFACTURING A LIQUID EJECTION ELEMENT

FIELD OF THE INVENTION AND RELATED ART

The present invention relates to a liquid ejection element preferred for recording on recording medium by ejecting ink from ejection orifices, and a method for manufacturing such a liquid ejection element.

In recent years, an ink jet recording apparatus has been increased in recording density and recording speed. With the increase, an ink jet recording head also has been increased in the density at which its ejection orifices are arranged, and the number of nozzles. The size of a liquid ejection element is dependent upon the number of ejection orifices, that is, energy generating members. Therefore, increasing a liquid ejection element in the number of ejection nozzles increases a liquid ejection element in size. On the other hand, in order to record in full-color, an ink jet recording head needs to be provided with multiple liquid ejection elements, the number of which equals the number of various color inks ejected by the liquid ejection elements for full-color recording. Thus, not only is a liquid ejection element required to be long enough in terms of the direction parallel to the direction in which ejection nozzles are aligned, but also, to be as small as possible in the sizes of the structural components other than the structural component which has the ejection nozzles. In addition, from the standpoint of improvement in the efficiency with which the various materials for a liquid ejection element are utilized, that is, in order to minimize the amount of each of the various materials for a liquid ejection element, a liquid ejection element is desired to be as small as possible.

Regarding this subject, Japanese Laid-open Patent Applications 2002-67328 and 2000-52549 disclose a proposal for reducing in size the surface area of a liquid ejection element used for external electrical connection. According to this proposal, the front and rear surfaces of the substrate of a liquid ejection element are connected with the use of through electrodes in order to reduce in size the abovementioned areas. Employment of this structural arrangement makes it possible to use the rear side of a liquid ejection element to connect the electrical components of the liquid ejection element to the electrical components on another substrate, minimizing thereby the effects of the members for electrically connecting the former to the latter, upon the gap between the surface of the liquid ejection element, which has ejection orifices, and recording medium.

In order to make electrical connection between a liquid ejection element having a large number of liquid ejection nozzles arranged at a high density, to the electrical component on another substrate, on the rear side of the liquid ejection element, a large number of through electrodes must also be arranged at a high density. When using through electrodes, through holes are formed in advance through the substrate of a liquid ejection element. Generally, these through holes are made with the use of a laser or dry etching. These methods, however, suffer from the following problems. That is, the longer the through hole to be formed, that is, the thicker the substrate, the less, in positional accuracy, straightness, and perpendicularity, the resultant through hole. Further, the thicker the substrate, the longer the time required to form the through holes, and therefore, the higher the cost for forming the through holes. As for a through electrode, it is formed in a through hole by plating. Thus, the longer the through hole to be filled by plating, that is, the smaller the ratio of the diameter of the through hole relative to the thickness of the substrate, the more difficult it is to fill the through hole by plating. For the above given reasons, it has been difficult to arrange a large number of through electrodes at a high density, as long as a substrate used for manufacturing a liquid ejection element remains the same as it has been.

Unless a large number of through electrodes can be arranged at a high density, it is difficult to take advantage of the merit of using through electrodes, that is, being able to make electrical connection between the electrical components of a liquid ejection element and the electrical components on another substrate, that is, a substrate other than the substrate of the ink ejection element, on the rear side of the liquid ejection element, and therefore, it is difficult to reduce in size a liquid ejection element.

Further, an ink supply canal is also a through hole made in the substrate of a liquid ejection element. Therefore, the above described problems concerning the formation of the through electrodes also concern the ink supply canal, in terms of positional accuracy and processing time. From the standpoint of positional accuracy, the positional relationship between an energy generating element and ink supply canal is of a greater concern, because the nonuniformity in the positional relationship between an energy generating member and ink supply canal in a liquid ejection element affects the characteristic of the liquid ejection element in terms of liquid ejection, lowering thereby the level of image quality at which recording is made by the liquid ejection element.

As for the means for solving these problems, it is possible to reduce in thickness the precursor of the substrate of a liquid ejection element, that is, a plate of a predetermined substance, on which energy generating members are formed, and through which the through holes are formed. In reality, this is not feasible for the following reason. That is, when forming energy generating members, through electrodes, etc., the substrate of a liquid ejection element is subjected to a film forming process which is carried out in a vacuum. During this process, the substrate is subjected to high temperatures. Therefore, if the precursor of the substrate of a liquid ejection element is thin, it is likely to warp or break. Further, when forming electrical elements other than energy generating members on the substrate, the substrate is put through high temperature processes such as diffusion. Therefore, the temperature of the substrate (precursor of substrate) becomes even higher, which is more likely to cause the substrate to warp and/or break than the aforementioned film forming process in a vacuum. Moreover, a nozzle plate is likely to be formed of resin, and if resin is used as the material for the nozzle plate, the thin substrate (precursor of substrate) of a liquid ejection element is likely to be warped by the residual stress or the like which occurs as the resin hardens. Warping of the substrate (precursor of substrate) results in the reduction in the level of accuracy at which the various structural components of a liquid ejection element are formed through the processes which follow the nozzle formation, and also, makes it difficult to handle the substrate thereafter.

SUMMARY OF THE INVENTION

The primary object of the present invention is to efficiently manufacture a liquid ejection elements at a high level of accuracy, in order to yield a liquid ejection element which is substantially smaller in size and cost than a liquid ejection element manufactured by a liquid ejection element manufacturing method in accordance with the prior art.

According to an aspect of the present invention, there is provided a manufacturing method for manufacturing a liquid ejection element including a liquid flow path which is open at an ejection outlet for ejecting liquid, and an energy generating member for generating energy usable for ejecting the liquid from liquid flow path through the ejection outlet, said manufacturing method comprising a step of forming the energy generating member on a front side of a substrate; a step of forming a top plate member on said side having said energy generating member formed by said energy generating member forming step, wherein said top plate member is a member in which said liquid flow path and said ejection outlet are formed; and a step of thinning said substrate, having said top plate member formed thereon by said top plate member forming step, from a back side thereof.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described with reference to the appended drawings.

In the following descriptions of the preferred embodiments of the present invention, "liquid ejection element substrate" (which hereinafter may be referred to simply as element substrate) means a piece of plate on which electrical structural components, such as an energy generating member, an electrode, and the like, for ejecting liquid are formed.

Basically, "liquid", droplets of which are the objects to be ejected by a liquid ejection element, means ink, that is, liquid which contains a single or multiple coloring matters. However, it also includes liquid which is used for processing recording medium before or after the deposition of ink onto the recording medium. Whether the liquid ejected by a liquid ejection element is ink or liquid for processing recording medium does not affect the effects of the present invention.

Figure 1:
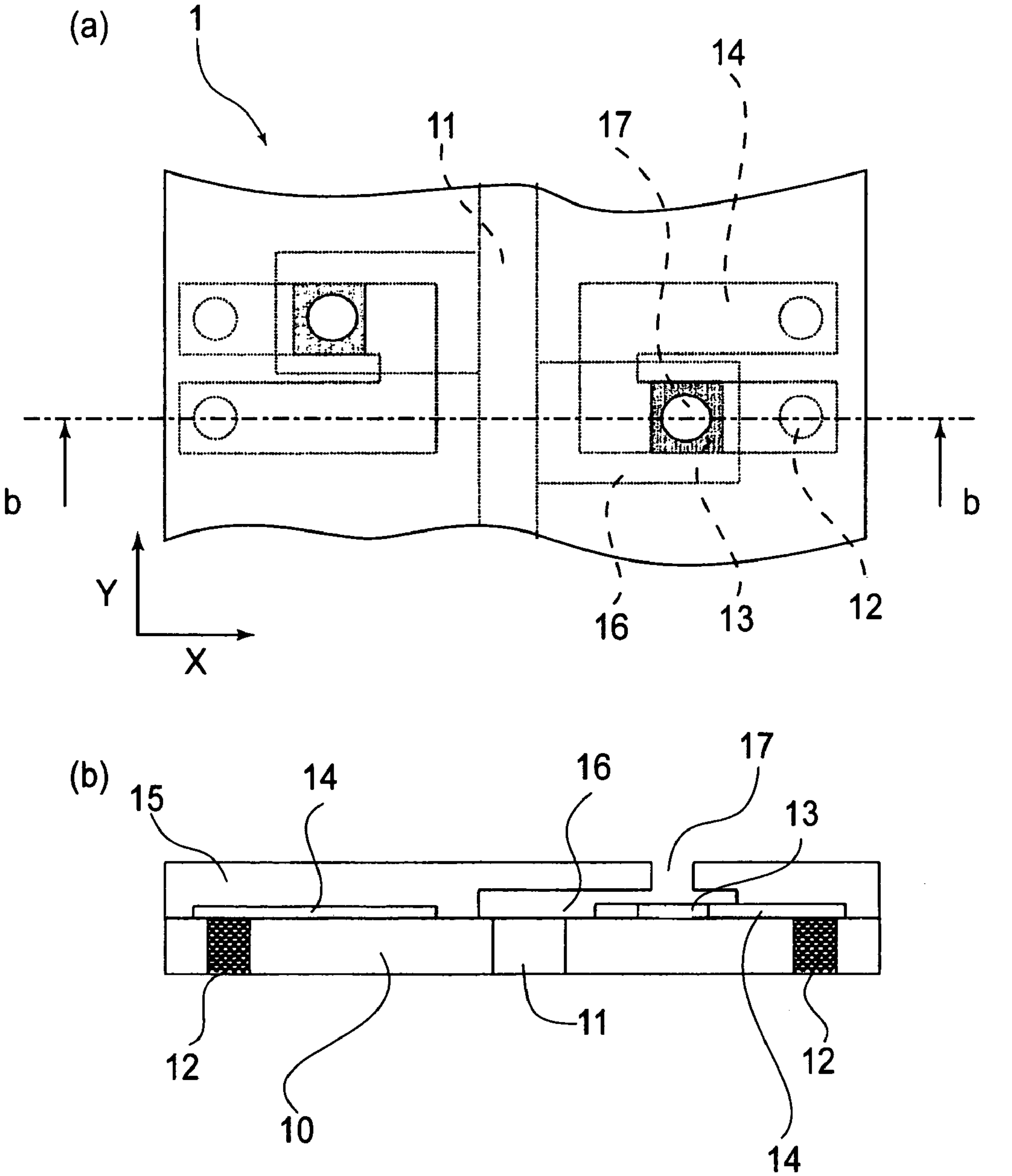
FIG. 1(*a*) is a plan view of one the essential parts of the liquid ejection element in the first embodiment of the present invention, and FIG. 1(*b*) is a sectional view of the portion of the liquid ejection element shown in FIG. 1(*a*), at Line b-b in FIG. 1(*a*).

FIG. 1(*a*) is a plan view of one of the essential parts of the liquid ejection element in this embodiment, and FIG. 1(*b*) is a sectional view of the part of the liquid ejection element shown in FIG. 1(*b*), at Line b-b in FIG. 1(*a*).

The liquid ejection element 1 shown in FIG. 1 is made up of multiple heat generation resistors 13 as energy generating members, an element substrate 10, and a top plate 15, that is, the outermost layer that has multiple nozzles. The heat generation resistors 13 are formed on the element substrate 10. The top plate 15 is placed on the element substrate 10 to cover the heat generation resistors 13 on the element substrate 10 so that the nozzles of the top plate 15 face the heat generation resistors 13 one for one.

The element substrate 10 is formed of a plate of silicon. There are the multiple heat generation resistors 13, and multiple electrical wires 14 which are in connection with the heat generation resistors 13 one for one, on the front surface of the element substrate 10. The liquid ejection element 1 is provided with an ink supply canal 11, which looks like a slit. In terms of the thickness direction of the element substrate 10, the ink supply canal 11 extends from the front surface of the element substrate 10 to the rear surface of the element substrate 10, and in terms of the lengthwise direction (Y direction) of the element substrate 10, the ink supply canal 11 extends from the center portion of one of its edges parallel to the widthwise direction of the element substrate 10, to the center portion of the other edge. The heat generation resistors 13 are arranged in two straight lines on the element substrate 10 so that one line of heat generation resistors 13 are on one side of the ink supply canal 11 and the other line of heat generation resistors 13 are on the other side of the ink supply canal 11, and also, so that the heat generation resistors 13 in one line are offset in the direction of the lines by ½ a pitch from the corresponding heat generation resistors 13 in the other line. To each end of each of the wires 14, one of through electrodes 12 is connected, which extend from the front surface of the element substrate 10 and to the rear surface of the element substrate 10.

The top plate 15 has multiple ejection orifices 17 which align with the heat generation resistors 13 one for one, and multiple ink passages 16 in which the heat generation resistors 13 are present, one for one, and which lead to the ink supply canal 11 on one side, and the ejection orifices 17, one for one, on the other side. The top plate 15 can be formed of a resin, for example.

The element substrate 10 is formed by reducing in thickness a plate of the material for the element substrate 10 thicker than the element substrate 10. However, this process of reducing in thickness this thicker plate is carried out after the formation of the top plate 15 on the thicker plate.

The liquid ejection element 11 is mounted on a base plate (unshown), along with another substrate on which the circuit for supplying electric power to the heat generation resistors 13 in response to recording signals in order to drive the heat generation resistors 13, and various other elements, are disposed. The combination of the liquid ejection element 1, another substrate, and base plate constitutes an ink jet recording head. The additional substrate is positioned on the rear side of the liquid ejection element 1, and electric power is supplied to the heat generation resistors 13 from the power supply circuit on the additional substrate through the through electrodes 12 and electrical wires 14. The base plate has an ink outlet (unshown), one end of which is connected to the ink supply canal 11, and the other end of which is connected to an ink storage portion (unshown) which holds ink.

The ink in the ink storage portion is supplied to the ink supply canal 11, and fills each of the ink passages 16 due to the presence of capillary force, remaining therein with a meniscus formed in each of the ejection orifices 17. With the ink remaining in this condition, the heat generation resistors 13 are driven to heat the ink on the selected heat generation resistors 13 enough to cause the ink to generate bubbles so that ink is ejected from the ejection orifices 17, by the pressure generated by the growth of the bubbles.

Next, the steps in the process for manufacturing the liquid ejection element 1 in this embodiment will be described.

(Liquid Ejection Element Manufacturing Method 1)

Figure 2:
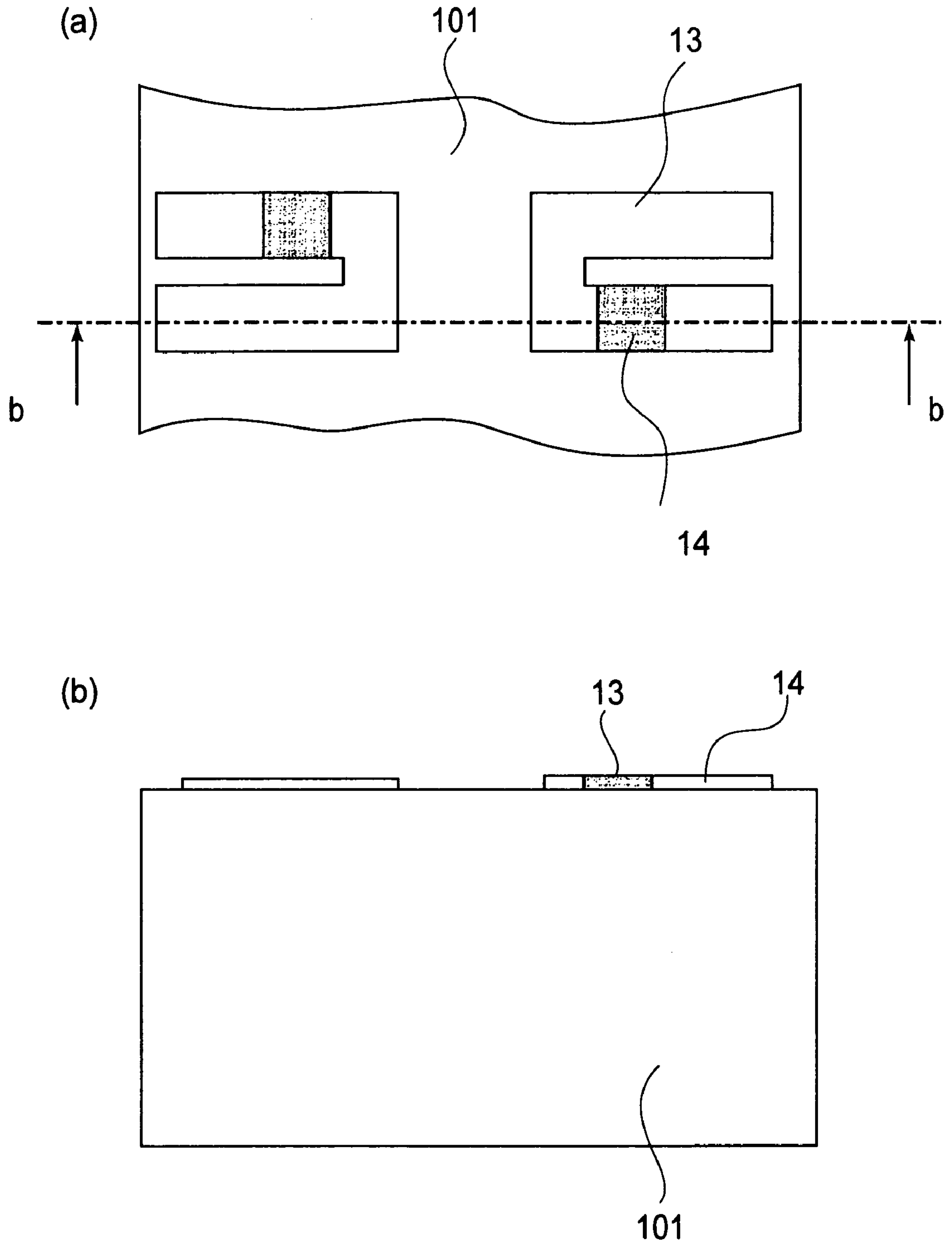
FIG. 2 is a schematic drawing for showing one of the steps of one (first) of the methods for manufacturing the liquid ejection element liquid ejection element shown in FIG. 1.

Referring to FIG. 2, first, a film of TaN and a film of Al are formed by sputtering on the front surface of a silicon substrate 101, which is 625 μm in thickness, being thicker in this stage than at the completed liquid ejection element 1. Then, the heat generation resistors 13 and electrical wires 14 are formed in predetermined patterns from the films of TaN and Al, respectively, with the use of a photo-lithographic technologies. The size of each heat generation resistor 13 is 30 μm 30 μm. If necessary, a protective layer (unshown) may be formed on the heat generation resistors 13 and electrical wires 14.

Figure 3:
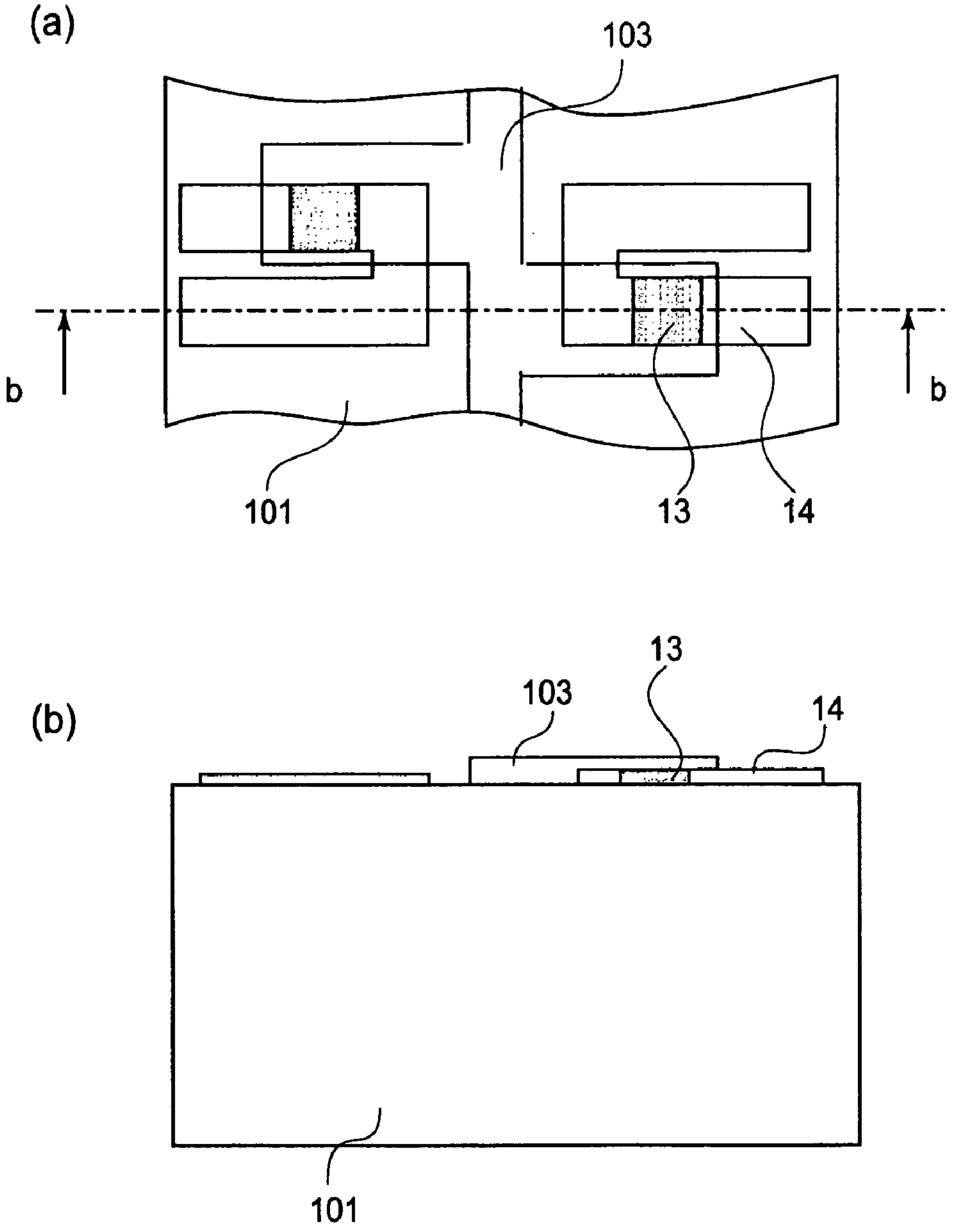
FIG. 3 is a schematic drawing for showing one of the steps of the first method for manufacturing method the liquid ejection element liquid ejection element shown in FIG. 1.
Figure 4:
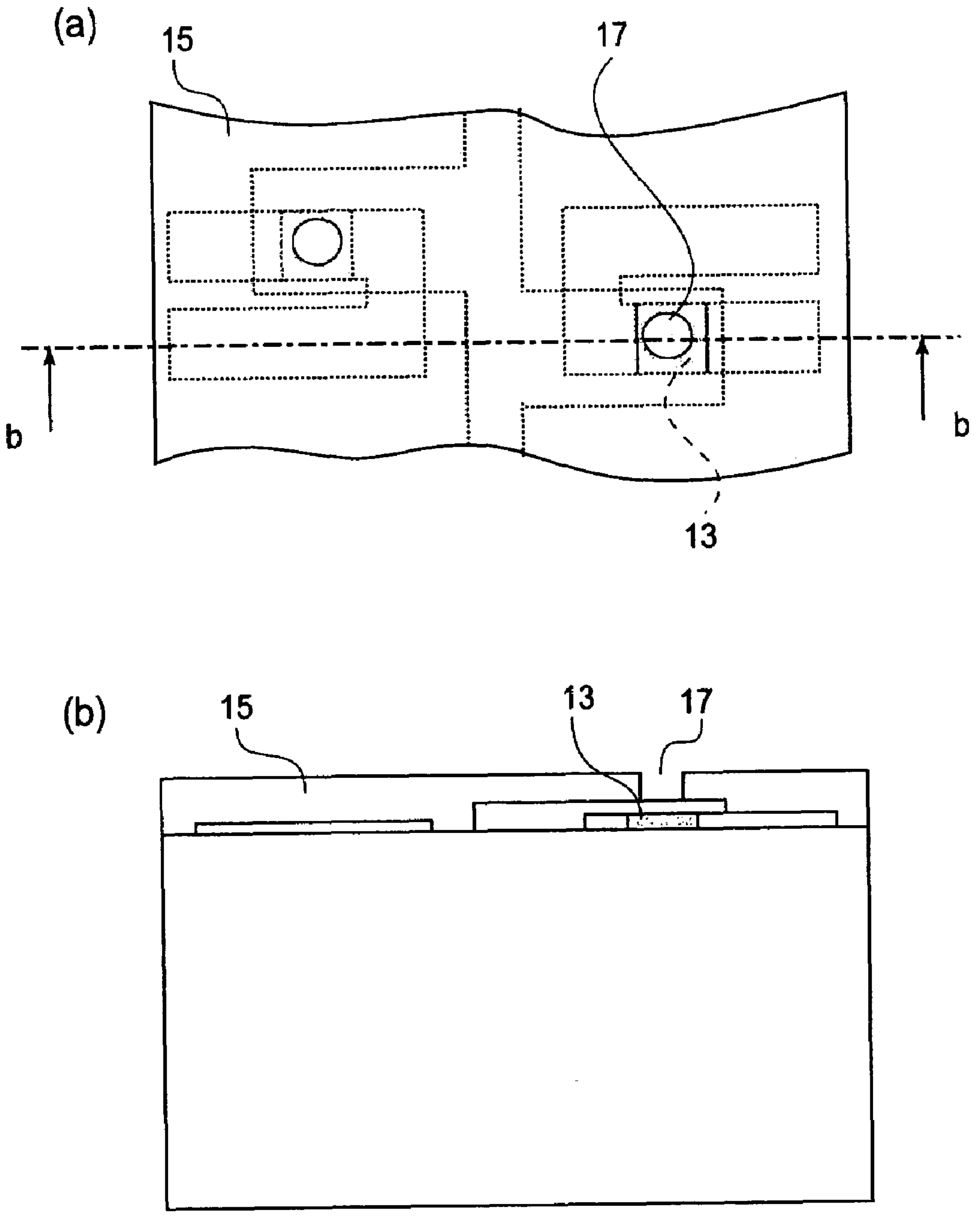
FIG. 4 is a schematic drawing for showing one of the steps of the first method for manufacturing the liquid ejection element liquid ejection element shown in FIG. 1.

Next, referring to FIG. 3, positive resist is coated to a thickness of 15 μm across the surface of the silicon substrate 101 which are holding the heat generation resistors 13 and electrical wires 14. Then, the selected portions of the resist layer are removed with the use of the exposing process and developing process, effecting thereby an ink passage layer 103 having the ink passage 16 (FIG. 1).

Figure 14:
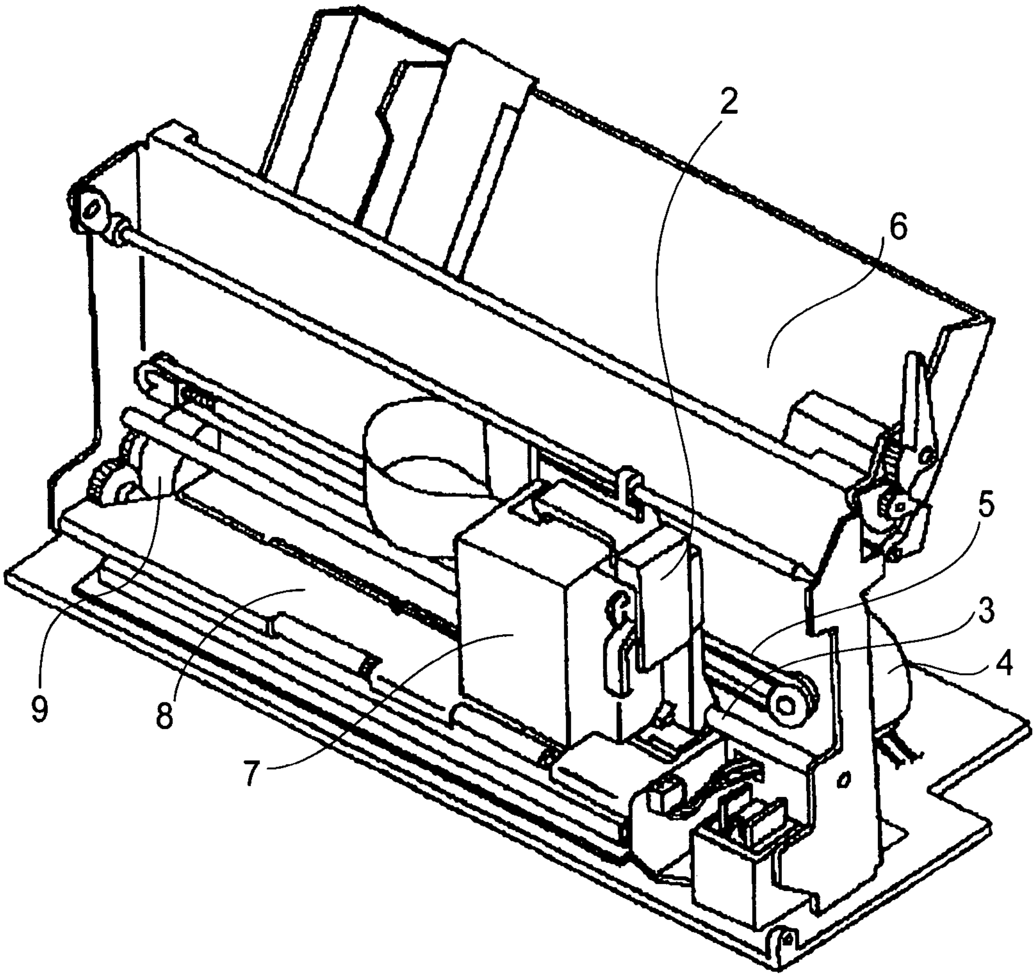
FIG. 14 is a perspective view of a typical ink jet recording apparatus to which the present invention is applicable with good results.

This ink passage layer 103 is coated by with photosensitive epoxy resin (negative resist) to a thickness of 30 μm. The portions of the epoxy resin layer, which correspond in position to the heat generation resistors 13, one for one, with the presence of the ink passage layer 103 between the epoxy resin layer and heat generation resistors 13, are removed by the exposing process and developing process, effecting multiple ejection orifices 17. In other words, the top plate 15 shown in FIG. 14 is formed. The diameter of each ejection orifice 17 is 25 μm.

Figure 5:
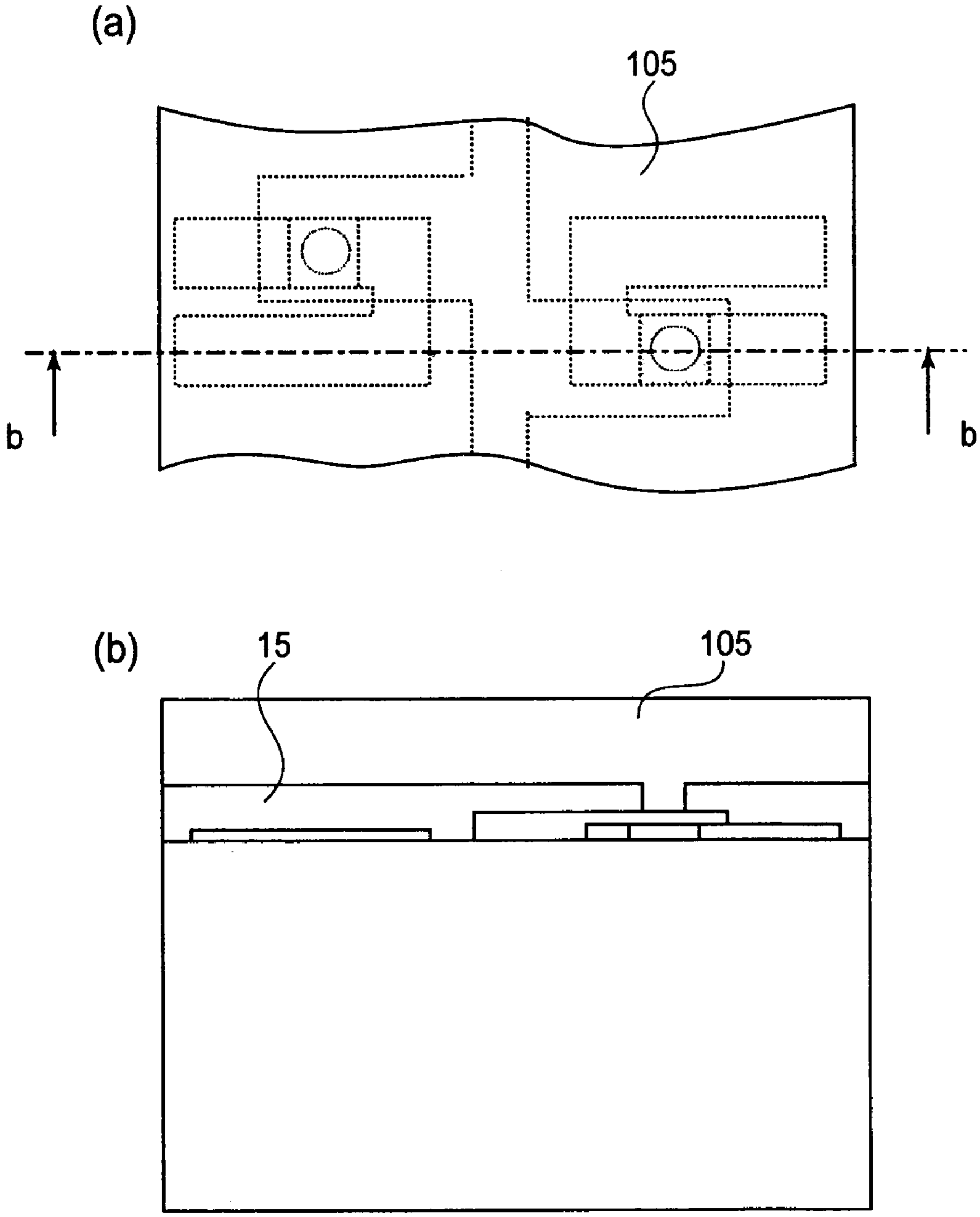
FIG. 5 is a schematic drawing for showing one of the steps of the first method for manufacturing the liquid ejection element liquid ejection element shown in FIG. 1.
Figure 6:
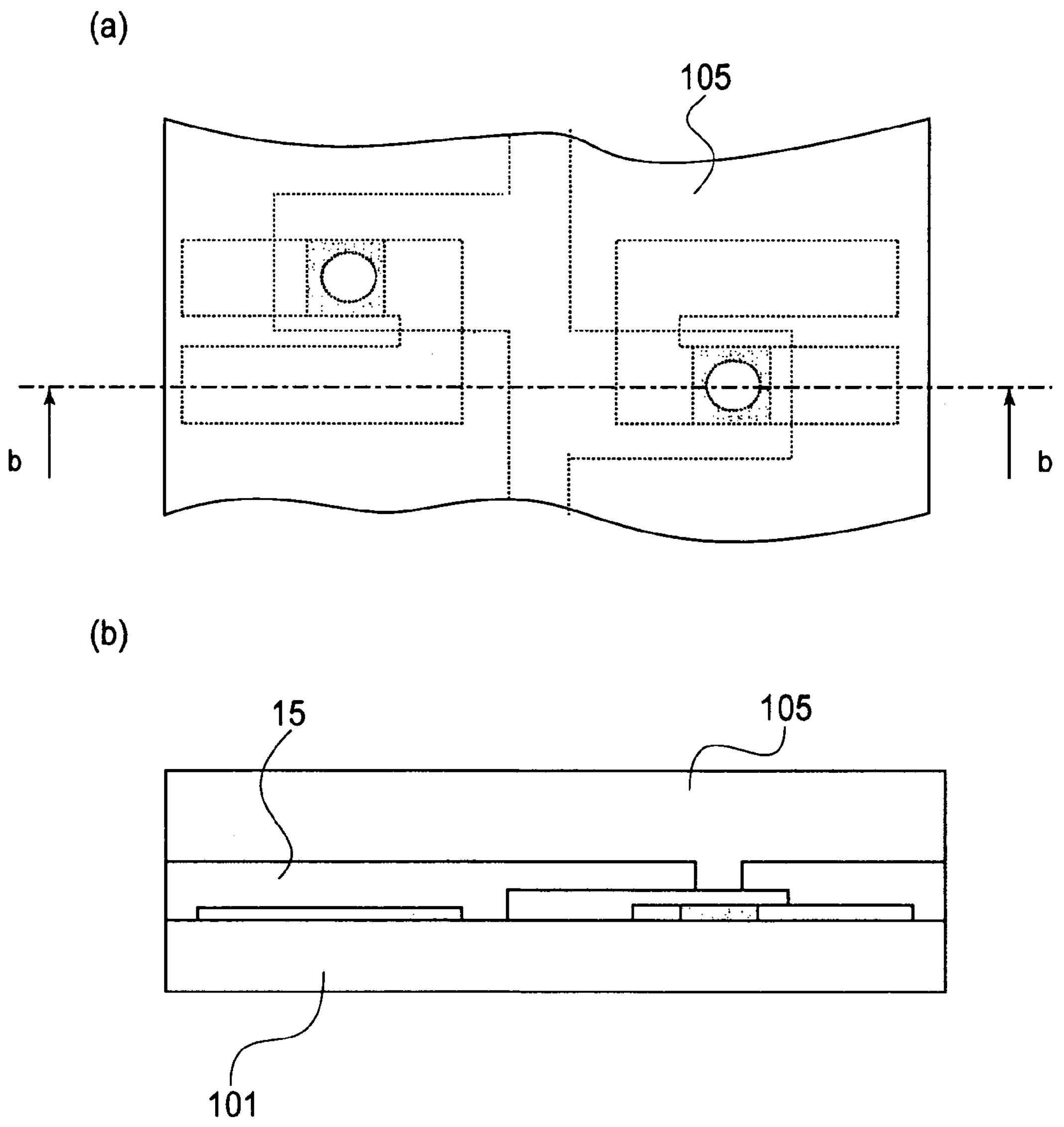
FIG. 6 is a schematic drawing for showing one of the steps of the first method for manufacturing the liquid ejection element liquid ejection element shown in FIG. 1.

Next, referring to FIG. 5, the top surface of the top plate 15 is coated with resin; a protective layer 105 is formed across the top plate 15. After the formation of the protective layer 105, the silicon substrate 101 is reduced in thickness from the rear side as shown in FIG. 6. As for the method for reducing the silicon substrate 101 in thickness, the silicon substrate 101 can be ground away from the rear side. If necessary, the rear surface of the thinned silicon substrate 101, which is rough due to the grinding, may be chemically and/or mechanically polished or spin etched. The value to which the silicon substrate 101 is reduced in thickness is determined according to the length of time necessary thereafter for forming the through electrodes 12 (FIG. 1) and ink supply canal 11 (FIG. 1), and the required level of ease with which the silicon substrate 101 can be handled. From these standpoints, the thickness of the silicon substrate 101 after its thinning is desired to be in a range of 50 μm-300 μm. If it is no less than 300 μm, it is possible that the holes of the through electrodes 12, and ink supply canal 11, will be incorrectly formed in terms of position and perpendicularity, and also, it takes more time to process the silicon substrate 101 to form these holes and canal. On the other hand, if it is no more than 50 μm, it is possible that the silicon substrate 101 will be difficult to handle, although the above described problems, that is, the problems which might occur if the thickness of the silicon substrate after its reduction is no less than 300 μm, will not occur.

Figure 7:
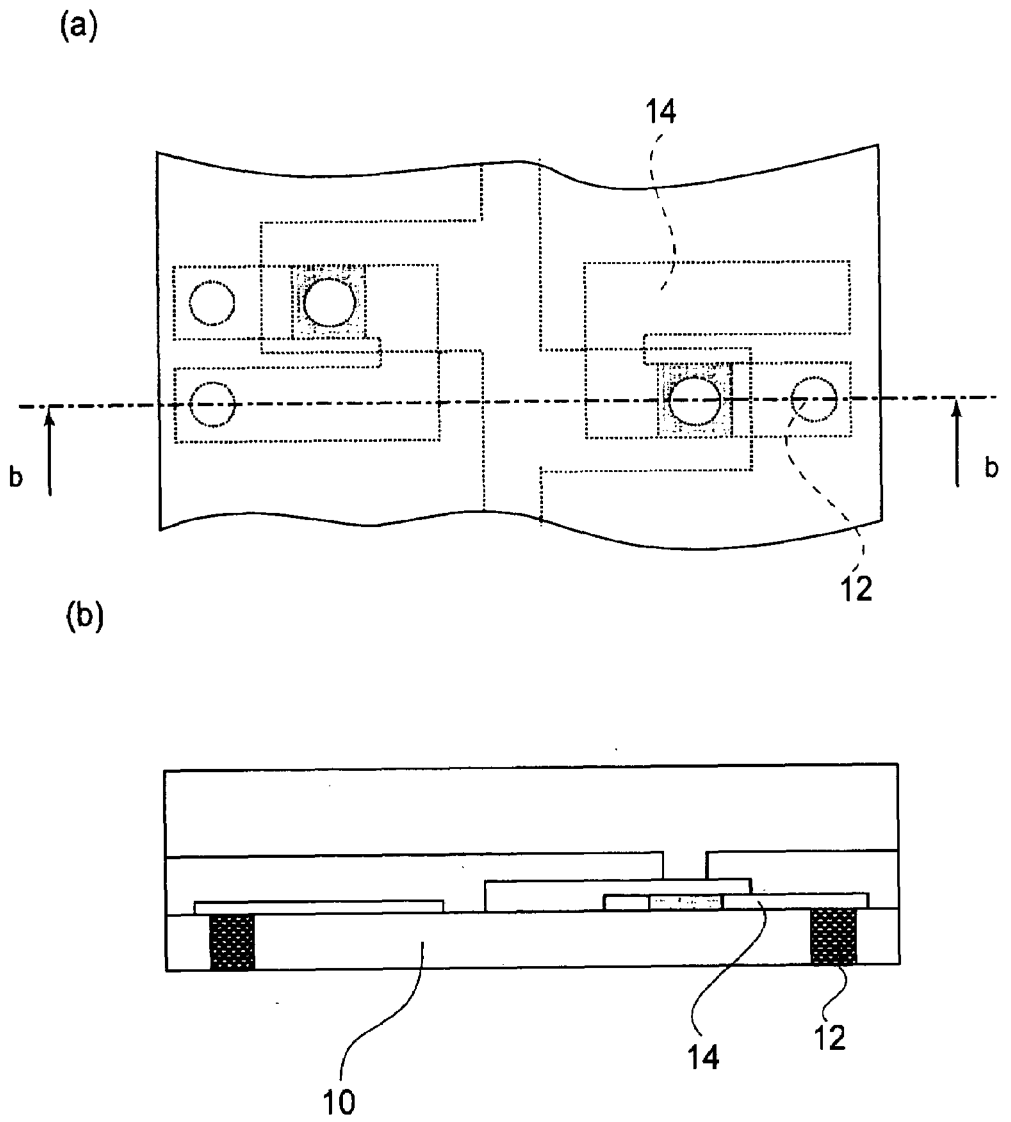
FIG. 7 is a schematic drawing for showing one of the steps of the first method for manufacturing the liquid ejection element liquid ejection element shown in FIG. 1.

Next, referring to FIG. 7, the through electrodes 12, which extend from the front surface of the silicon substrate 101 to the rear surface of the silicon substrate 101, are formed, with the use of the following method, for example, so that they coincide with the end portions of electrical wires 14, one for one. That is, multiple through holes with a diameter of 70 μm are formed by dry etching, laser processing, or the like, through the portions of the silicon substrate 101, through which the through electrodes are to be formed. These holes for the through electrodes 12 are formed from the rear side of the silicon substrate 101. If necessary, the internal surface of each through hole may be coated with an insulating film. Then, a seed layer (unshown) for plating is formed on the coated, or bare, internal surface of each hole. Then, each through hole, the internal surface of which has been covered with the seed layer for plating, is filled with gold, as the electrode material, by electrolytic plating to form the through electrode 12. This completes the silicon substrate 10. According to this method, the hole for each through electrode 12 is formed after the silicon substrate 101 is reduced in thickness. Therefore, this method makes it possible to form the holes at a higher level of accuracy and in a shorter length of time than the method in accordance with the prior art.

Figure 8:
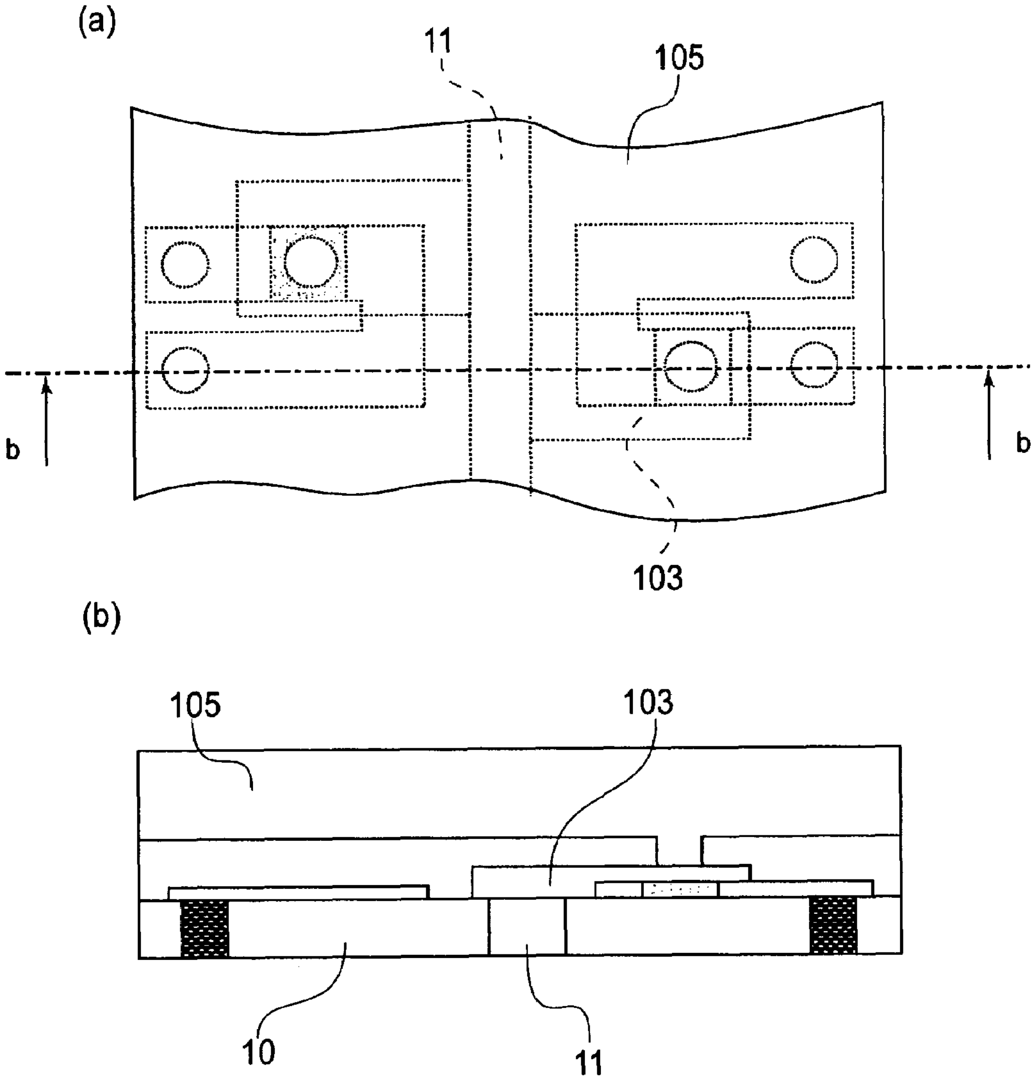
FIG. 8 is a schematic drawing for showing one of the steps of the first method for manufacturing the liquid ejection element liquid ejection element shown in FIG. 1.

Next, referring to FIG. 8, the ink supply canal 11, which extends from the front surface of the element substrate 10 to the rear surface of the element substrate 10, is formed with the use of the following method, for example. That is, first, a layer of etching mask is formed on the rear surface of the element substrate 10, and the portion of the masking layer, which corresponds in position to the ink supply canal 11, is removed with the use of a pattern. Then, the ink supply canal 11 is formed by dry etching, laser processing, or the like. Lastly, the masking layer is removed. While forming the ink supply canal 11, the liquid passage layer 103 works as a stopper layer.

Lastly, the ink passage layer 103 and protective layer 105 are removed to yield the liquid ejection element 1 shown in FIG. 1.

When the above described manufacturing method in this embodiment is used for manufacturing the liquid ejection element 1, the through holes for the through electrodes 12 are formed through the element substrate 10, which is substantially thinner than when the manufacturing method in accordance with the prior art is used. Therefore, the element substrate 10 can be processed at a higher level of accuracy in terms of position and measurement. Therefore, the through electrodes 12 can be arranged at a substantially higher density. Consequently, using the liquid ejection element manufacturing method in this embodiment to manufacture a liquid ejection element with a certain specification, which used to be manufactured with the use of a liquid ejection element manufacturing method in accordance with the prior art, makes it possible to reduce the element substrate 10 in surface area, and also, in the length of time required to process the element substrate 10 to form the through holes for the through electrodes 12, than when the method in accordance with the prior art is used. In other words, the method in this embodiment can manufacture the element substrate 10 with higher efficiency, making it thereby possible to reduce the manufacturing cost for the element substrate 10. With the reduction in the surface area and manufacturing cost of the element substrate 10, it is possible to reduce the liquid ejection element 1 itself in surface area and manufacturing cost. Further, the top plate 15 is formed before the silicon substrate 101 is reduced in thickness. Therefore, even though the element substrate 10 of the liquid ejection element 1 formed with the use of the manufacturing method in this embodiment is thinner, it does not occur that the element substrate 10 is caused to warp by the stress which occurs as the resinous material for the top plate 15 hardens. Therefore, not only can the element substrate 10 be more reliably held for the manufacturing steps thereafter, but also, it is not likely to break as it is handled for manufacturing, making it easier to handle the element substrate 10 in general terms. Further, since the liquid ejection element manufacturing method in this embodiment does not cause the element substrate 10 to warp, it makes it possible to form the various structural components of the liquid ejection element 1 at a higher level of accuracy in terms of measurement and position, making it thereby possible to yield a large number of liquid ejection elements 1, which are superior in liquid ejection characteristics to a liquid ejection element 1 formed with the manufacturing method in accordance with the prior art, and are less deviated from the specifications than the liquid ejection element 1 formed with the manufacturing method in accordance with the prior art.

Further, according to the liquid ejection element manufacturing method in this embodiment, the ink supply canal 11 is formed after the silicon substrate 101 is reduced in thickness. Therefore, it is possible to more accurately position the ink supply canal 11. Therefore, it can improve the liquid ejection element 1 in terms of the measurements of the ink supply canal 11 and heat generation resistors 13, and the positional relationship between the ink supply canal 11 and each of the heat generation resistors 13. Therefore, it can improve the liquid ejection element 1 in terms of the ink ejection characteristic. Also according to the liquid ejection element manufacturing method in this embodiment, the electrical connection between the components on the element substrate 10 and the components on another substrate is made on the rear side of the liquid ejection element 1 through the through electrodes 12, eliminating thereby the components which would have projected from the front side of the liquid ejection element 1 if the liquid ejection element 1 is manufactured with the use of the manufacturing method in accordance with the prior art. Therefore, it can reduce the distance between the recording medium and the external opening of each ejection orifice 17, compared to that of a liquid ejection element 1 manufactured with the use of the manufacturing method in accordance with the prior art, in which the electrical connection is formed on the front side of the liquid ejection element 1. Reducing the distance between the recording medium and the external opening of each ejection orifice improves the liquid ejection element 1 in terms of the level of accuracy at which the ink droplets ejected from the liquid ejection element 1 land on the intended spots on the recording medium. Therefore, the liquid ejection element manufacturing method in this embodiment can improve the liquid ejection element 1 in terms of recording quality.

Also according to the liquid ejection element manufacturing method in this embodiment, the top plate 15 is formed by exposing, and then, developing, the photosensitive resin. Therefore, it can more precisely form the top plate 15. Therefore, not only does it make it possible to more accurately form the ink passages 16 and ejection orifices 17 in terms of measurement, but also, to better align them with the heat generation resistors 13. In other words, the liquid ejection element manufacturing method in this embodiment can be satisfactorily used to manufacture even a liquid ejection element that ejects substantially smaller liquid droplets. Incidentally, there has been a trend to reduce an ink jet head in the size of an ink droplet ejected by an ink jet head in order to make it possible to record at a higher level of precision with the use of an ink jet head. However, the smaller the liquid droplet, the smaller the kinetic energy it possesses, and therefore, the lower in the level of accuracy at which it lands on the recording medium. Thus, being capable of forming the top plate 15 at a higher level of accuracy is advantageous in consideration of the abovementioned trend.

(Liquid Ejection Element Manufacturing Method 2)

In the preceding method for manufacturing the liquid ejection element, the through electrodes 12 were formed after the silicon substrate 101 was reduced in thickness. However, the liquid ejection element 1 can be manufactured with the use of a liquid ejection element manufacturing method different from the preceding one. Hereinafter, the second method, that is, one of the liquid ejection element manufacturing methods different from the preceding one will be described.

Figure 9:
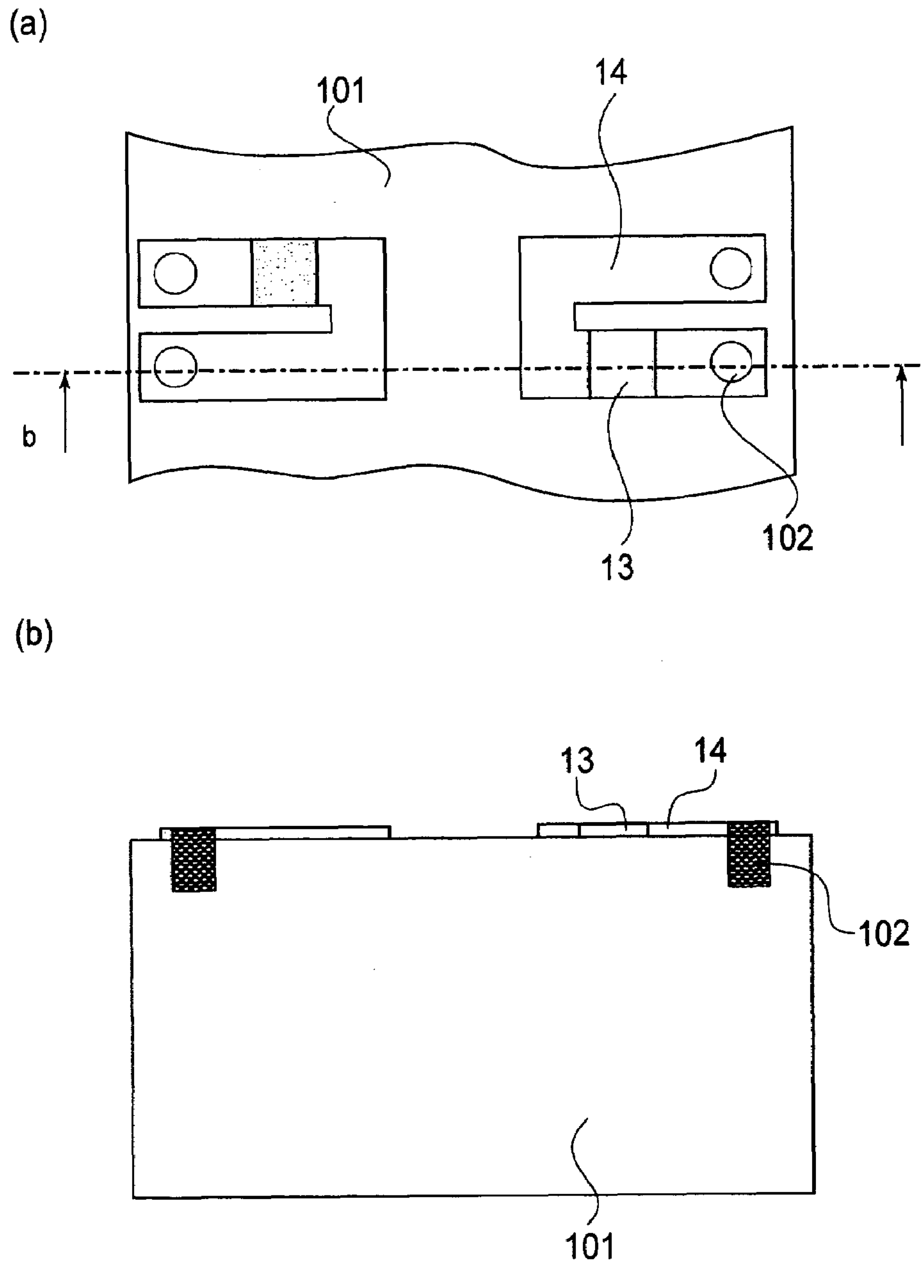
FIG. 9 is a schematic drawing for showing one of the steps of the second method for manufacturing the liquid ejection element liquid ejection element shown in FIG. 1.

Up to the step in which the heat generation resistors 13 and electrical wires 14 are formed on the silicon substrate 101, that is, the step shown in FIG. 2, this second method is the same as the preceding method. Thereafter, multiple electrodes 102 are formed so that each of them is partially exposed above the front surface of the silicon substrate 101, and the rest is embedded in the silicon substrate 101, and also, so that electrical connection is made between each of them and the corresponding electrical wire 14, as shown in FIG. 9, with the use of the following method, for example.

That is, first, a blind hole is formed to a predetermined depth through each end portion of each electrical wire 14 and the corresponding portion of the silicon substrate 101. The predetermined depth means such a depth that after the thickness reduction of the silicon substrate 101, the distance from the front surface of the silicon substrate 101 to the bottom of each blind hole will be greater than the thickness of the silicon substrate 101. These holes can be formed by dry etching, laser processing, or the like. After the formation of these blind holes, a seed layer (unshown) for plating is formed on the internal surface of each blind hole. Then, each blind hole, the internal surface of which has been covered with the seed layer for plating, is filled with gold, by plating the internal surface of each blind hole with gold as the electrode material. As a result, each electrode 102 is formed, a part of which is embedded in the electric wire 14 and the rest of which is embedded in the silicon substrate 101.

Each of the embedded electrodes 101 will eventually become a through electrode 12 (FIG. 1). Therefore, the diameter of each blind hole should be equal to the diameter of a through electrode 12, whereas the depth of a blind hole may be chosen within a range in which the blind hole can be satisfactorily filled with the material for the through electrode. The depth of a blind hole, in other words, the measurement of the embedded electrode 102 in terms of the thickness direction of the silicon substrate 101, is desired to be in a range of 50-300 μm. If this measurement is no less than 300 μm, it is possible that the holes for the embedded electrodes 102 will be formed with reduced accuracy in terms of position and perpendicularity, and also, it takes more time to process the silicon substrate 101 to form the through electrodes 12. On the other hand, if it is no more than 50 μm, the above described problems do not occur. However, the silicon substrate 101 must be rendered thinner by a greater amount to turn the embedded electrodes 102 into through electrodes 12. Therefore, it is possible that the silicon substrate 101 will be difficult to handle after its thickness reduction. As long as the depth of each blind hole is within the aforementioned range, and the diameter of each blind hole is no less than 25 μm, the blind holes can be satisfactorily filled with the material for the through electrode 12. The larger the diameter of each blind hole, the more satisfactorily each blind hole will be filled with the electrode material. However, there is the upper limit to the blind hole diameter, which is dependent on the pitch at which the heat generation resistors 13 are arranged, in other words, the pitch at which the precursor 102 of each through electrode 12 is embedded. In this embodiment, the blind hole for each through electrode precursor 102 is formed so that it will be 25 μm in diameter and 300 μm in the depth from the surface of the silicon substrate 101.

Figure 10:
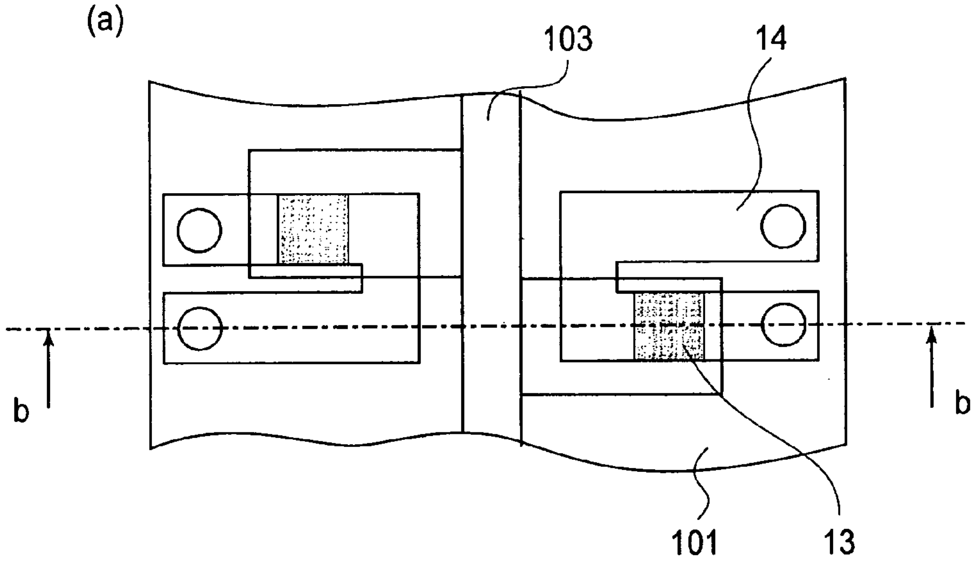
FIG. 10 is a schematic drawing for showing one of the steps of the second method for manufacturing method the liquid ejection element liquid ejection element shown in FIG. 1.
Figure 10:
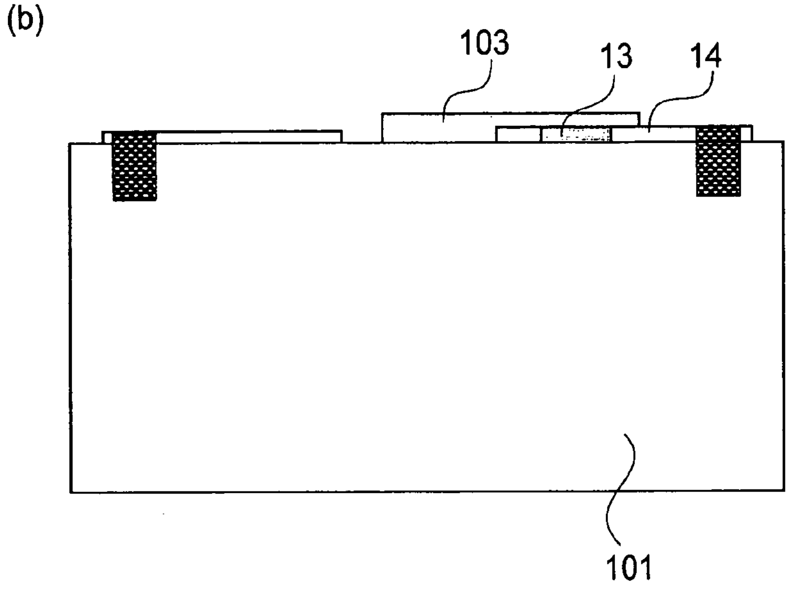

Next, referring to FIG. 10, thereafter, positive resist is coated to a thickness of 15 μm across the surface of the silicon substrate 101, which is holding the heat generation resistors 13 and electrical wires 14. Then, the selected portions of the resist layer are removed with the use of the exposing process and developing process, effecting thereby an ink passage layer 103 having the ink passage 16 (FIG. 1).

Figure 11:
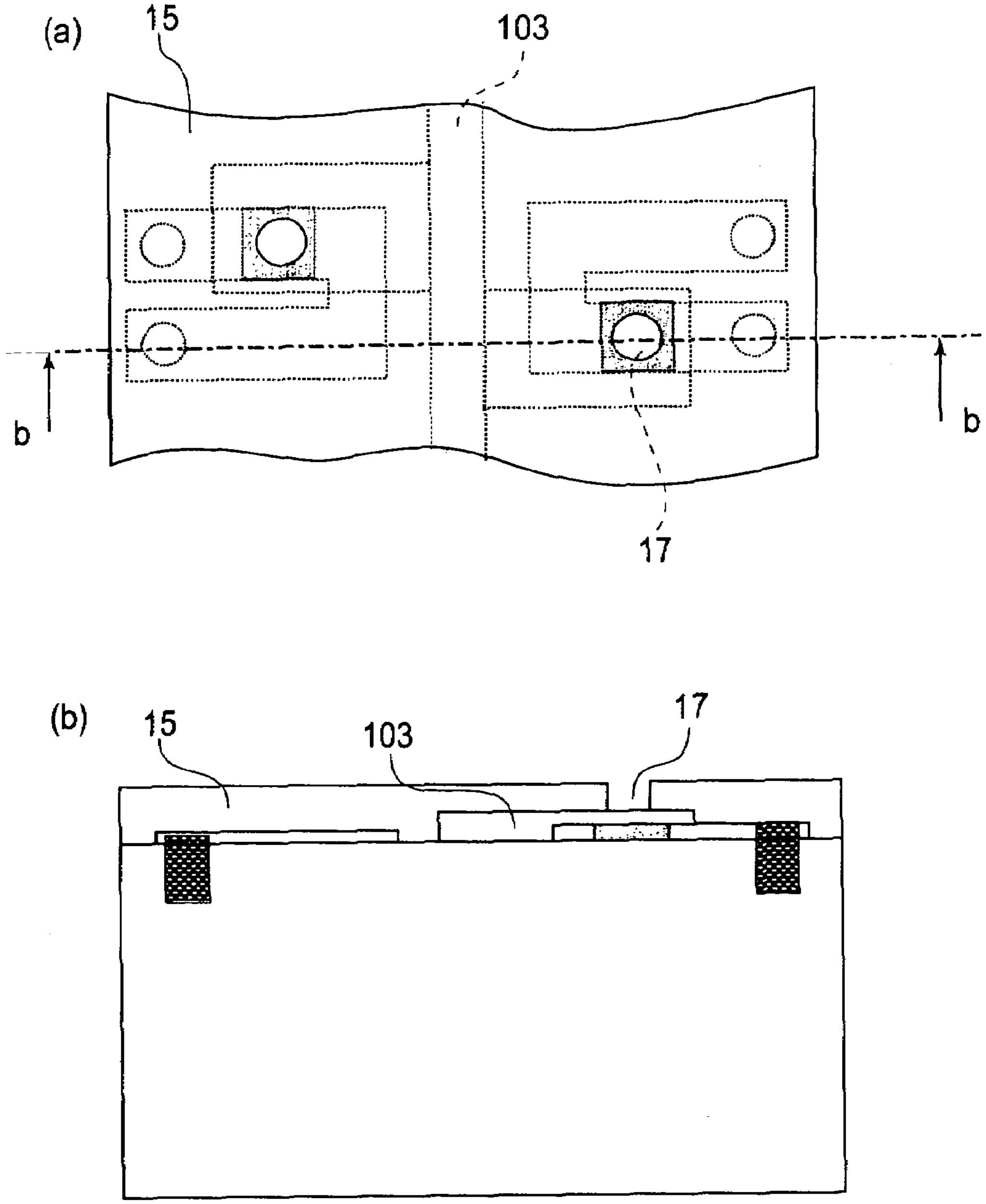
FIG. 11 is a schematic drawing for showing one of the steps of the second method for manufacturing the liquid ejection element liquid ejection element shown in FIG. 1.

This ink passage layer 103 is coated by with photosensitive epoxy resin (negative resist) to a thickness of 30 μm. Then, the portions of the epoxy resin layer, which correspond in position to the heat generation resistors 13, one for one, with the presence of the ink passage layer 103 between the epoxy resin layer and heat generation resistors 13, are removed by the exposing process and developing process, effecting multiple ejection orifices 17. In other words, a top plate 15 shown in FIG. 11 is formed. The diameter of each ejection orifice 17 is 25 μm.

Figure 12:
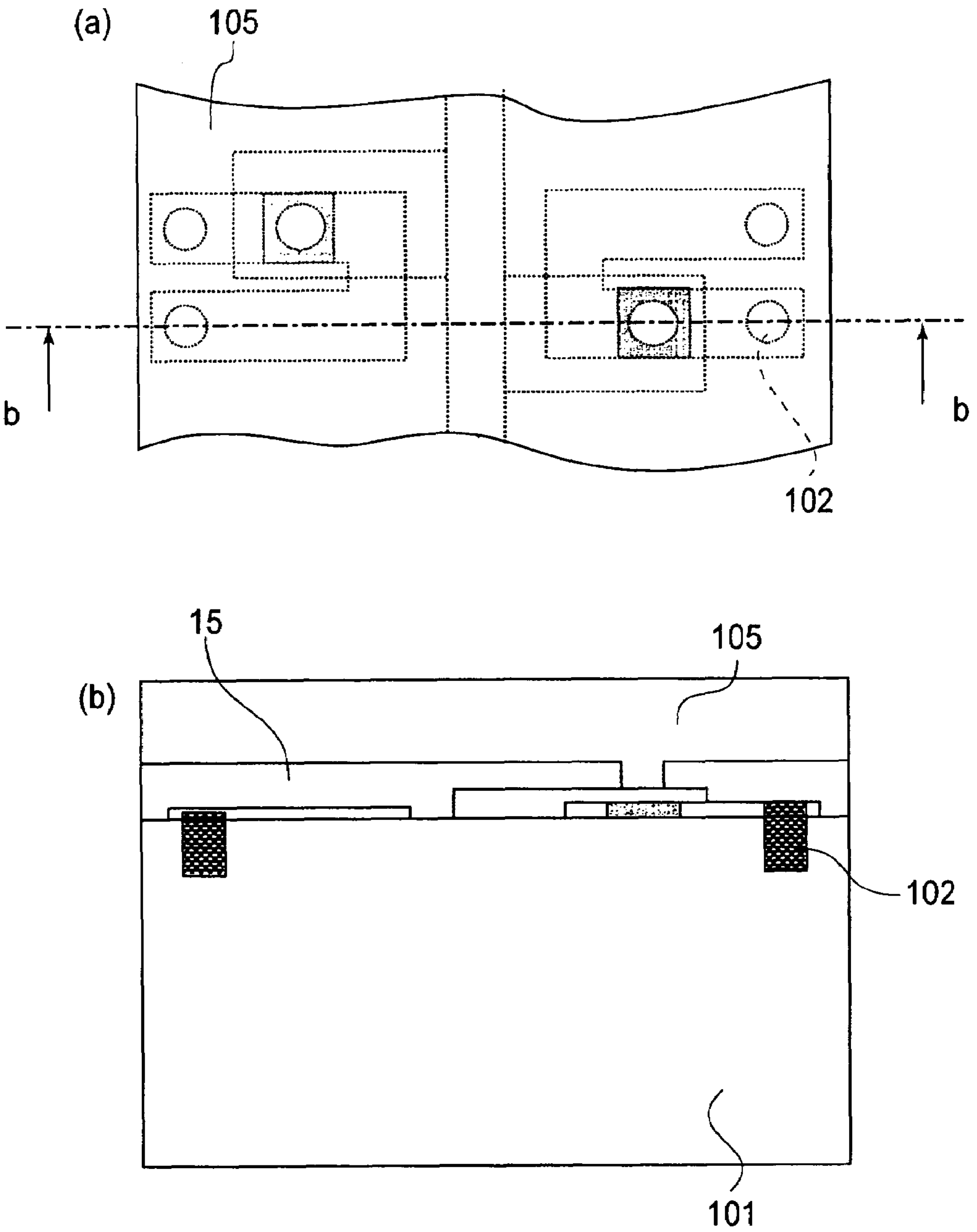
FIG. 12 is a schematic drawing for showing one of the steps of the second method for manufacturing the liquid ejection element liquid ejection element shown in FIG. 1.
Figure 13:
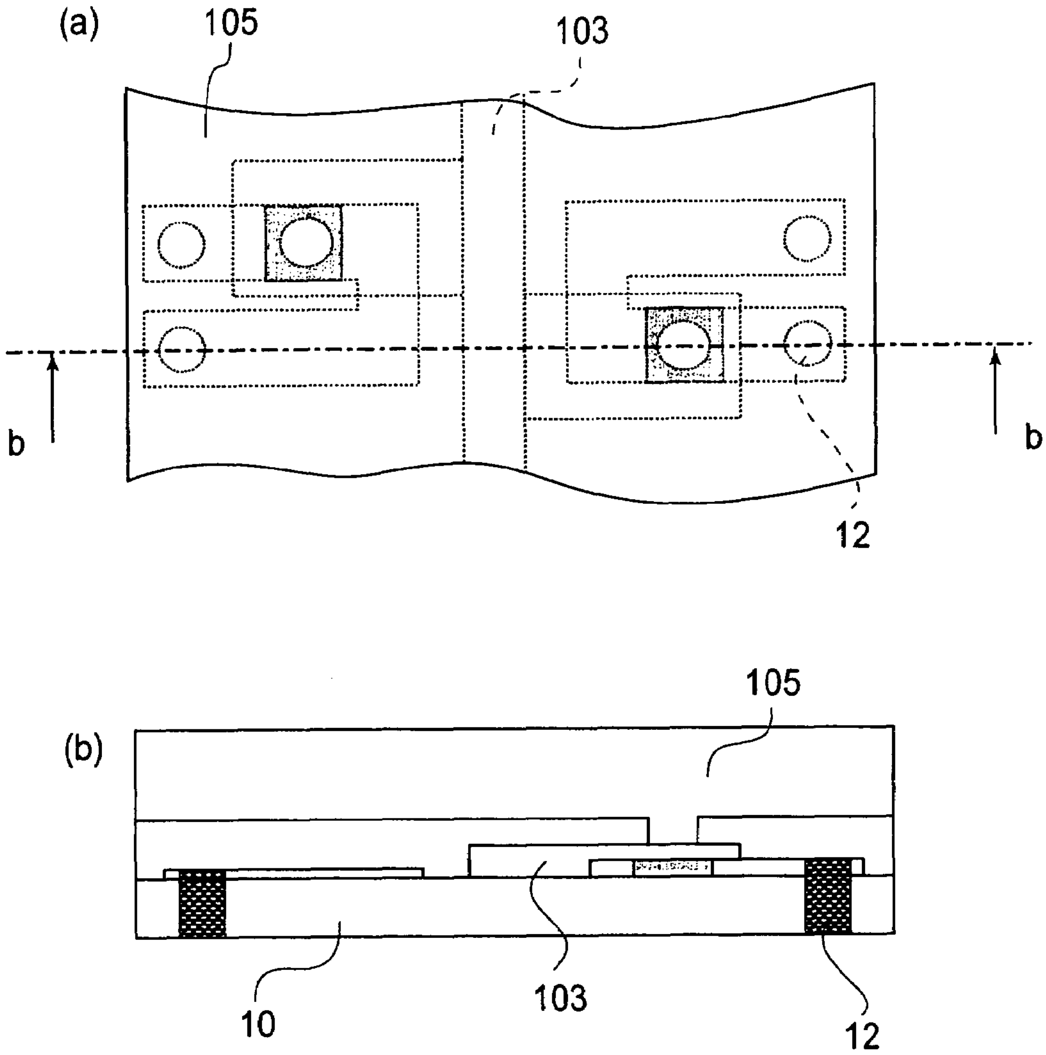
FIG. 13 is a schematic drawing for showing one of the steps of the second method for manufacturing the liquid ejection element liquid ejection element shown in FIG. 1.

Next, referring to FIG. 12, the top surface of the top plate 15 is coated with resin to form a protective layer 105 on the top plate 15. After the formation of the protective layer 105, the silicon substrate 101 is reduced in thickness from the rear side in order to expose the embedded electrodes 102, that is, the precursors of the through electrodes 12. As a result, the element substrate 10, shown in FIG. 13, having a predetermined number of through electrodes 12 is yielded. As for the method for reducing the silicon substrate 101 in thickness, the same method as that used by the preceding liquid ejection element manufacturing method can be used.

Thereafter, the ink supply canal 11 is formed in the element substrate 10 with the use of the same method as that used in the preceding liquid ejection element manufacturing method. Then, the ink passage layer 103 and protective layer 105 are removed to yield the liquid ejection element 1 shown in FIG. 1.

The liquid ejection element manufacturing method in this embodiment is smaller in the number of the steps to be carried out after the substrate thickness reduction, being therefore superior to the preceding method, in terms of the number of times the substrate has to be handled. Further, it creates the through electrodes 12 by reducing in thickness the silicon substrate 101 after forming the precursors 102 of the through electrodes 12 in the silicon substrate 101 in the manner of embedding the precursor 102 in the silicon substrate 101. Therefore, the rear surface of the resultant element substrate 10 is flat, ensuring that the element substrate 10 is reliably held during the following steps of the liquid ejection element manufacture. Being able to reliably hold the element substrate 10 makes it possible to precisely form the structural components which will be formed in the following steps.

As described above, according to this liquid ejection element manufacturing method, first, the top plate 15 is formed on the element substrate 10 (or silicon substrate 101), and then, the element substrate 10 is reduced in thickness. Therefore, it is possible to prevent the element substrate 10 from being warped by the formation of the top plate 15. Therefore, it is possible to manufacture a large number of liquid ejection elements 1 at a high level of yield and a high level of accuracy. Consequently, this method greatly contributes to reducing the liquid ejection element 1 in size and manufacturing cost.

Incidentally, in the case of the above described liquid ejection element 1, the heat generation resistors 13 are arranged in two lines. However, the arrangement of the heat generation resistors 13 does not need to be limited to the above described manner. Also in the case of the above described liquid ejection element 1, the heat generating resistor 13, which gives thermal energy to ink, is used as the energy generating member. However, an electro-mechanical transducer such as a piezoelectric element, which gives ejection energy to ink by mechanically vibrating ink, may be used as the energy generating member.

Next, referring to FIG. 14, an example of an ink jet recording apparatus to which the present invention is applicable with good results will be described.

The ink jet recording apparatus shown in FIG. 14 is an ink jet recording apparatus of the serial type. It has: a carriage 2 reciprocally movable along a guide shaft 3 supported by the frame of the ink jet recording apparatus; an automatic sheet feeding apparatus 6 which holds in layers multiple sheets of recording medium, that is, objects on which recording is made, and which feeds one by one the sheets of recording medium therein into the main assembly of the apparatus; and a sheet conveyance mechanism made up of various rollers such as conveyance roller, sheet discharge rollers, etc., for conveying the sheets of recording medium sent from the automatic sheet feeding apparatus 6, etc. To the carriage 2, a part of a timing belt 5 which is driven by the rotation of a carriage motor 4 is attached. Thus, as the carriage motor 4 is rotated forward or in reverse, the carriage 2 is moved forward or in reverse, respectively, along the guide shaft 3. The carriage 2 holds an ink jet cartridge 7, which is removably mountable on the carriage 2. The ink jet cartridge 7 is an integral combination of a recording head which comprises the above described liquid ejection element 1 (FIG. 1), and an ink container filled or refilled with the ink which is to be supplied to the recording head. The recording head is mounted on the carriage 2 so that ink is ejected downward. Incidentally, if the ink jet recording apparatus is a monochromatic recording apparatus, the recording head has only a single liquid ejection element 1, whereas if it is a multi-color recording apparatus, the recording head has multiple liquid ejection elements 1, the number of which matches the number of various inks to be ejected by the recording head. Also in the case of a multi-color recording apparatus, the recording head is provided with multiple ink containers, the number of which also matches the number of various inks to be ejected by the recording head.

After being fed from the automatic sheet feeding apparatus 6, each sheet of recording medium is conveyed by the sheet conveyance mechanism in the direction intersectional to the direction in which the carriage 2 is reciprocally moved, so that the sheet of recording medium moves along the top surface of a platen 8 disposed so that it faces the recording head of the ink jet cartridge 7. The automatic sheet feeding apparatus 6 and sheet conveyance mechanism are driven by a feed motor 9.

Recording is made on the sheet of recording medium by reciprocally moving the carriage 2 while ejecting ink droplets from the recording head. As for the movement of the sheet of recording medium, the sheet of recording medium is intermittently conveyed at a predetermined pitch, that is, it is conveyed at a predetermined pitch each time the movement of the carriage 2 in one direction is completed, or each time the single reciprocal movement of the carriage 2 is completed. As a result, recording is made across the entirety of the sheet of recording medium.

In the preceding embodiment of the present invention, the ink jet cartridge 7 is an integral combination of the recording head and ink container. However, the ink jet cartridge 7 may be structured so that the recording head and ink container can be separated from each other to allow the ink container to be replaced as it is completely deleted of the ink therein.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 210141/2004 filed Jul. 16, 2004 which is hereby incorporated by reference.

What is claimed is:

1. A method for manufacturing a liquid ejection element including a liquid flow path which is open at an ejection outlet for ejecting liquid and an energy generating member for generating energy usable for ejecting the liquid from the liquid flow path through the ejection outlet, said method comprising the steps of:

forming the energy generating member on a front side of a substrate;

forming, through said substrate, a penetrating electrode which is electrically connected with said energy generating element and which penetrates through said substrate from said front side to the back side thereof;

forming a top plate member on said side having said energy generating member formed by said energy generating member forming step, wherein said top plate member is a member in which said liquid flow path and said ejection outlet are formed; and thinning said substrate, having said top plate member formed thereon by said top plate member forming step, from a back side thereof, wherein said top plate member forming step includes a step of forming a resist layer at a position to form said liquid flow path, a step of applying photosensitive resin material on the resist and forming an ejection outlet in said photosensitive resin material by exposure and development, and a step of removing said resist after said thinning step.

2. The method according to claim 1, wherein said penetrating electrode forming step includes a step of forming a through hole in said substrate after said thinning step and a step of filling an electrode material in said through hole.

3. The method according claim 1, wherein said penetrating electrode forming step includes a step of forming a hole in said surface of the substrate and a step of forming an embedded electrode electrically connected with said energy generating element, wherein after said embedded electrode forming step, the embedded electrode is exposed at the back side by said substrate thinning step to provide said penetrating electrode.

4. The method according to claim 1, wherein said thinning step thins a thickness of said substrate to 50 μm-300 μm.

5. The method according to claim 1, further comprising a step of forming, after said substrate thinning step, a supply port, through said substrate, for supplying the liquid to be ejected to said liquid flow path from the back side of said substrate.

6. A method for manufacturing a liquid ejection element including a liquid flow path which is open at an ejection outlet for ejecting liquid and an energy generating member for generating energy usable for ejecting the liquid from the liquid flow path through the ejection outlet, said method comprising the steps of:

forming the energy generating member on a front side of a substrate;

forming, through said substrate, a penetrating electrode which is electrically connected with said energy generating element and which penetrates through said substrate from said front side to the back side thereof;

forming a top plate member on said side having said energy generating member formed by said energy generating member forming step, wherein said top plate member is a member in which said liquid flow path and said ejection outlet are formed; and thinning said substrate, having said top plate member formed thereon by said top plate member forming step, from a back side thereof.

7. The method according claim 6, wherein said penetrating electrode forming step includes a step of forming a through hole in said surface after said thinning step and a step of filling an electrode material in said through hole.

8. The method according claim 6, wherein said penetrating electrode forming step includes a step of forming a hole in said surface of the substrate and a step of forming an embedded electrode electrically connected with said energy generating element, wherein after said embedded electrode forming step, the embedded electrode is exposed at the back side by said substrate thinning step to provide said penetrating electrode.

9. The method according to claim 6, wherein said thinning step thins a thickness of said substrate to 50 μm - 300 μm.

10. The method according to claim 6, further comprising a step of forming, after said substrate thinning step, a supply port, through said substrate, for supplying the liquid to be ejected to said liquid flow path from the back side of said substrate.

* * * * *